3,647,687
PROCESS OF CONDITIONING SEWAGE SLUDGE
IN SYSTEM WITH BY-PASS VALVE SYSTEM FOR
A SOLVENT WASH
Albert H. Matthiesen, Schofield, Wis., assignor to Sterling Drug Inc., New York, N.Y.
Filed July 2, 1970, Ser. No. 51,850
Int. Cl. C02c 1/40
U.S. Cl. 210—63     8 Claims

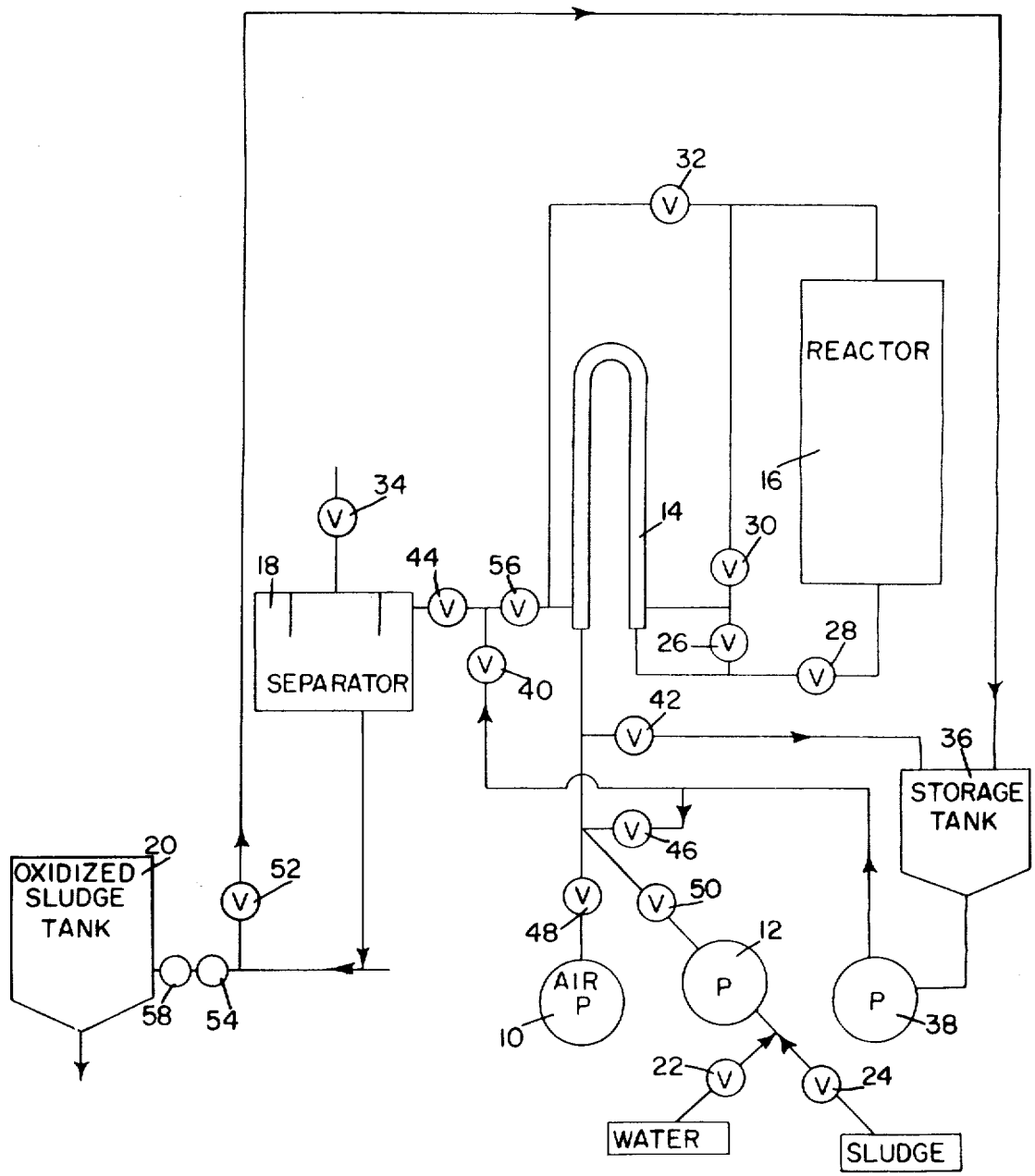

ABSTRACT OF THE DISCLOSURE

A solvent washing system utilizing a by-pass for removing scale on the tubes and shells of the heat exchange parts of a system for treating sewage sludge.

BACKGROUND OF THE INVENTION

Attention is directed to U.S.P. 3,359,200 containing a description of processes for the partial wet air oxidation of sewage sludge. Such systems as well as others for the same purpose eventually build up scale which gradually forms on various tubes and shells of heat exchanges, in the piping which is in contact with the sludge and oxidized sludge, etc. Indication of decrease in thermal efficiency is evidenced by a decrease in heat transfer in the heat exchangers, and this is in turn indicated by increasing temperature differences usually accompanied by an increased pressure drop. When this condition becomes evident a solvent washing procedure is employed in order to put the system back into its former efficient status. A principal object of the present invention relates to a by-pass valve system wherein the reactor which forms part of the conventional system may be periodically bypassed and a cleaning fluid comprising air and water may be passed first through the tubes of the heat exchanger or exchangers thence reversely through the shell portion thereof and thence directly to the usual separator and providing for periodic cleaning and washing of tubing and piping of the heat exchangers without depressurizing the reactor in a plant for oxidation of sewage sludge or other waste effluent.

SUMMARY OF THE INVENTION

In a wet air oxidation system in normal operation, air and waste material provided by an air compressor, e.g., and a high pressure pump flow through the system to the tubes of a heat exchanger, to a reactor, thence to the shell portion of the heat exchanger and thence to a separator. Oxidized sludge is separated from the vapors in the separator and discharged to an oxidized sludge storage tank. Scale gradually forms on the tubes and shells of the heat exchangers and in the piping which is in contact with the sludge and the oxidized sludge.

In order to take care of a situation of this kind, this invention provides a by-pass valve system by which means cold water and air may periodically by-pass the reactor, passing cleaning fluid through the tubes of the heat exchanger then reversely through the shell portion thereof and thence to the separator whereby the hot reactor contents are isolated from the system for restart-up use. Cold water and air flow through the tubes and shell of the heat exchanger causing the hot scale material to contract rapidly and flake away from the metallic portions of the heat exchanger and interconnected pipe. Thus it will be seen that a washing action is provided by the by-pass system without depressurizing the reactor and allowing for fast restart after the cleaning operation.

The invention also contemplates a solvent wash incorporated in the system to improve the thermal efficiency of the system. In this case the heat exchangers are depressurized, and a solvent solution is pumped through the system from a solvent tank, provided in the system, and a solvent pump. Appropriate valves are opened and closed in order to cut in the solvent solution pump so the solvent can travel through the shells of the heat exchangers and through the tubes thereof and return to the solvent tank in a current counter to the normal flow.

A reverse flow of material with water from another valve can be used to flush any blockage which may occur in this system.

Certain other valves and piping is provided so that solvents can be pumped selectively through the separator and the piping to the oxidized sludge tank.

The effect is that replacing the unit in operation after the solvent wash is very simple and requires merely the deactivation and isolation of the solvent system which is present and ready for use at all times.

The drawing is a diagram illustrating the invention.

PREFERRED EMBODIMENT OF THE INVENTION

Referring to the diagram there is here shown an air compressor 10, a high pressure pump 12, heat exchanger 14, hot reactor 16, a separator at 18 and an oxidized sludge tank at 20. A valve 22 controls flow leading in from a water line, and a valve 24 controls the incoming sludge, both under control of the pump. It will be noted that between the hot reactor 16 and the heat exchanger there is a system of piping and control and bypass valves 26, 28, 30 and 32, operation of which will be explained below. There is a pressure control valve for the separator 18 at 34. By proper manipulation of the above mentioned valves the bypass line in which the valve 26 is included permits cleaning effluent from the tubes of the heat exchanger 14 to be bypassed reversely through the shell of the heat exchanger and thence to the separator 18 bypassing the reactor 16 when the valve 26 is open.

There is a solvent storage tank 36 separate from and independent of the cold water line and a solvent pump at 38 with necessary piping and valve system 40, 42, 44 and 46 together with valve 56 as shown. The air compressor 10 has a control valve 48. There is also a valve 50 at the down stream side of the high pressure pump 12.

Valve 52 connects the oxidized sludge line leaving separator 18 to the solvent storage tank 36, and a valve 54 isolates the oxidized sludge tank 20 and the level control valve 58 from the oxidized sludge line.

In the normal operation of a wet air oxidation system, air and a waste material provided by the air compressor at 10 and a high pressure pump 12 flow through the system to the tubes of the heat exchanger 14, to the reactor 16, to the shells of the heat exchanger and thence to the separator 18. These various parts are well known in the art and it is believed need not be further described. In any event, the result is that oxidized sludge is separated from the vapors in the separator and discharged to the oxidized sludge storage tank 20.

As the unit continues to operate scale gradually forms on both the tubes and shells of the heat exchanger and on the connecting piping which is in contact with the sludge and oxidized sludge. Decrease in thermal efficiency is indicated by a decrease in heat transfer in the heat exchangers, and by increasing temperature differences, usually accompanied by an increased pressure drop.

When this condition becomes evident a solvent washing procedure is employed in which the cold water line valve at 22 is opened, and the waste sludge line valve 24 is closed. Cold water and air are thus being pumped into the system and perform a cleaning function on the tubes and piping of the system.

Shortly after this occurs the reactor by-pass valve 26 is opened and the reactor isolation valves at 28, 30 and 32 are closed. This allows the cold water and air to by-pass the reactor and flow directly to the outlet end of the shell of the heat exchanger and reversely therethrough and thence from the shell of the heat exchanger to the separator causing the hot reactor contents to be isolated from the system for future start-up.

In operation cold water and air flow through both the tubes and shell of the heat exchanger 14 causing the hot scale material to contract rapidly and flake away from the metallic parts of the heat exchangers and interconnecting piping.

In many instances this procedure is all that is required to place the unit in acceptable condition for a continued operation, and the valves at 28 and 30 are opened and valve 26 is closed cutting the reactor into the system; and the unit is switched over from cold water to sludge by opening valve 24 and closing valve 22.

However, should it become evident that a solvent wash is required to improve the thermal efficiency of the system the steps taken above are followed by a depressurization of the heat exchangers 14 with control valve 34. A solvent solution is pumped through the system using the solvent tank 36 and the solvent pump 38. Valves 40 and 42 are opened and valves 44, 46, 48, and 50 are closed. This allows the solvent to travel first through the shells of the heat exchanger 14, and then through the tubes of the heat exchanger, being returned through valve 42 to the solvent tank 36.

This is counter current to the normal flow through the heat exchangers. Should a blockage of scale occur in the heat exchangers it is possible to shut down the solvent system and using the high pressure pump 12, reverse the flow of material with water (from valve 22) and flush the blockage from the system to the level control valve to the oxidized sludge tank 20.

Scaling occasionally occurs in the separator 18 and associated piping to the oxidized sludge tank 20. In this instance solvent is pumped through the system by opening valves 44, 52, and 40, and closing valves 54 and 56. Placing the unit into operation after a solvent wash is simple and requires the deactivation and isolation of the solvent system. The air compressor 10 and high pressure pump 12 are activated and the heat exchanger 14 and separator system brought up to reactor pressure. At this point valves 28 and 30 are opened, cutting in the reactor, and valve 26 is closed. The high pressure pump is switched over from water to sludge by opening valve 24 and closing valve 22. The hot reactor contents provides sufficient heat in the heat exchanger 14 so that the system temperatures are brought back to normal without the use of external heat or with a minimum of external heat. Since the heat exchanger 14 and separator system pressure is brought up to the reactor pressure before cutting the reactor into the system, wear on valves 28 and 30 is reduced to a minimum.

During the normal operation in the wet air oxidation unit it is possible to inject solvent directly into the sludge and air stream by opening valve 46 and activating the solvent pump 38. The reactor can either be in the system or out of the system for this type of operation.

The washing procedures described above are equally applicable to thermal conditioning units as well as wet air oxidation units and to wet air oxidation units without a separator. In the case of thermal conditioning units and wet air oxidation units without a separator, the separator 18 is cut out and the level control valve 58 becomes the equivalent of pressure control valve 34. Valve 40 is attached to the system at the same point that valve 52 is located and valve 52 and its line are removed and eliminated from the system.

I claim:

1. A process of conditioning sewage sludge in a system including a sludge source, an on-and-off valve therefor, a high pressure pump for the sludge, an air source and piping from the high pressure pump and the air source to a heat exchanger, thence to a reactor, thence to a separator, and thereafter to an oxidized sludge tank, a cold water source separate from the sludge source and having a separate pipe leading to the pump;

comprising closing the sludge line to the pump, opening the cold water line to the pump, by-passing the cold water and said air past the reactor so that the hot reactor contents are isolated from the system, flowing the cold water and air through the heat exchanger causing the hot scale material to contract rapidly and flake away, and thereafter cutting off the cold water, opening the sludge line, and cutting the reactor back into the system.

2. The process of claim 1 wherein the system includes a source of solvent solution separate from and independent of the water source, and a solvent pump independent of the sludge pump, said process including the step of depressurizing the heat exchanger and pumping the solvent solution from the solvent source through the system prior to placing the reactor back in the system, flowing the solvent through the heat exchanger.

3. The process of claim 1 wherein the system includes a source of solvent solution separate from and independent of the water source, and a solvent pump independent of the sludge pump, said process including the step of depressurizing the heat exchanger and pumping the solvent solution from the solvent source through the system prior to placing the reactor back in the system, flowing the solvent through the heat exchanger, and returning the same to the solvent source, countercurrent to the normal flow of the sludge through the heat exchanger.

4. The process of claim 1 wherein the system includes a source of solvent solution separate from and independent of the water source, and a solvent pump independent of the sludge pump, said process including the step of depressurizing the heat exchanger and pumping the solvent solution from the solvent source through the system prior to placing the reactor back in the system, flowing the solvent through the heat exchanger then closing off the solvent, activating the high pressure pump, and reversing the flow of material with water, flushing any blockage from the system.

5. The process of claim 1 wherein the system includes a source of solvent solution separate from and independent of the water source, and a solvent pump independent of the sludge pump, said process including the step of depressurizing the heat exchanger and pumping the solvent solution from the solvent source through the system prior to placing the reactor back in the system, flowing the solvent through the heat exchanger, and returning the same to a solvent tank, countercurrent to the normal flow of the sludge through the heat exchanger, pumping solvent to the entire system including the separator and the hot reactor, and closing the sludge tank from the system returning the solvent to the solvent tank.

6. The process of claim 1 including bringing the heat exchanger and the separator system pressure up to reactor pressure before cutting the reactor back into the system after the washing action.

7. The process of claim 1 including the step of supplying a solvent, other than the cold water, to the sludge stream and cutting the reactor out of the system.

8. The process of claim 1 which includes the steps of flowing sludge and air under pressure through the pipes of the heat exchanger thence through the reactor and thence back through the shell of the heat excanger to the separator, then closing the sludge line and opening the cold water line to the pump, and passing cold water and air under pressure first through the tubes of the heat exchanger, then passing the effluent from the tubes directly to the shell of the heat exchanger by-passing the reactor and thence passing said effluent to the separator.

References Cited

UNITED STATES PATENTS

| 3,359,200 | 12/1967 | Gitchel et al. | 210—63 |
| 2,651,508 | 9/1953 | Bready | 165—95 X |

MICHAEL ROGERS, Primary Examiner

U.S. Cl. X.R.

165—95; 210—71, 177, 181